US012579455B2

(12) United States Patent
Bhargava et al.

(10) Patent No.: US 12,579,455 B2
(45) Date of Patent: Mar. 17, 2026

(54) ANALYZING MESSAGE FLOWS TO SELECT ACTION CLAUSE PATHS FOR USE IN MANAGEMENT OF INFORMATION TECHNOLOGY ASSETS

(71) Applicant: Dell Products L.P., Round Rock, TX (US)

(72) Inventors: Vivek Bhargava, Bangalore (IN); Vaideeswaran Ganesan, Bengaluru (IN); Rishav Sethia, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 892 days.

(21) Appl. No.: 17/869,285

(22) Filed: Jul. 20, 2022

(65) Prior Publication Data

US 2024/0028934 A1      Jan. 25, 2024

(51) Int. Cl.
*G06N 7/01*          (2023.01)
*G06F 40/205*       (2020.01)
*G06F 40/35*        (2020.01)

(52) U.S. Cl.
CPC ............. *G06N 7/01* (2023.01); *G06F 40/205* (2020.01); *G06F 40/35* (2020.01)

(58) Field of Classification Search
CPC .......... G06N 7/01; G06N 5/046; G06N 20/00; G06F 40/205; G06F 40/35; H04L 51/02; H04L 51/216
See application file for complete search history.

(56) References Cited

U.S. PATENT DOCUMENTS

| | | | | |
|---|---|---|---|---|
| 7,457,879 B2 * | 11/2008 | Horvitz | ................ | G06Q 10/107 |
| | | | | 709/227 |
| 7,539,654 B2 * | 5/2009 | Ramaswamy | ........ | G06F 3/0481 |
| | | | | 706/45 |
| 10,348,666 B2 * | 7/2019 | Bastide | ................... | H04L 51/18 |
| 10,528,874 B2 * | 1/2020 | Appel | ................... | H04L 51/216 |
| 11,138,510 B2 * | 10/2021 | Appel | ................... | G06N 5/022 |

(Continued)

OTHER PUBLICATIONS

C. Mathers, "The Learning Retention Pyramid: A Simple Guide," https://www.developgoodhabits.com/learning-pyramid/, Apr. 1, 2020, 18 pages.

(Continued)

*Primary Examiner* — Jordany Nunez

(74) *Attorney, Agent, or Firm* — Ryan, Mason & Lewis, LLP

(57)          ABSTRACT

An apparatus comprises a processing device configured to identify one or more message flows, a given one of the message flows comprising messages associated with management of a given information technology asset in an information technology infrastructure, and to parse the given message flow to identify branches in a sequence of the messages, a given branch comprising a given conditional clause and two or more possible action clause paths. The processing device is also configured to determine rankings of the possible action clause paths based at least in part on complexities of action clauses in the possible action clause paths, to select, for a given user, a particular action clause path based at least in part on the determined rankings of the possible action clause paths and a skill level of the given user, and to provide, to the given user, the selected action clause path.

20 Claims, 7 Drawing Sheets

400

(56) References Cited

U.S. PATENT DOCUMENTS

| | | | | |
|---|---|---|---|---|
| 11,185,781 B2 * | 11/2021 | Tortosa | | A63F 13/798 |
| 11,757,808 B2 * | 9/2023 | Makhija | | G06F 40/30 |
| | | | | 709/224 |
| 2005/0091184 A1 * | 4/2005 | Seshadri | | G06Q 10/107 |
| 2006/0167837 A1 * | 7/2006 | Ramaswamy | | G06F 3/0481 |
| 2015/0371278 A1 * | 12/2015 | Soni | | G06Q 50/01 |
| | | | | 705/14.66 |
| 2017/0374011 A1 * | 12/2017 | Bastide | | H04L 51/18 |
| 2019/0220774 A1 * | 7/2019 | Terry | | G06F 16/904 |
| 2019/0221133 A1 * | 7/2019 | Terry | | G06N 5/048 |
| 2020/0258045 A1 * | 8/2020 | Knupfer | | G06Q 10/1053 |
| 2020/0344185 A1 * | 10/2020 | Singaraju | | G06N 3/008 |
| 2021/0192653 A1 * | 6/2021 | Hunn | | G06F 21/64 |
| 2022/0116470 A1 * | 4/2022 | Sethi | | H04L 67/564 |
| 2023/0110941 A1 * | 4/2023 | Makhija | | G06F 40/284 |
| | | | | 709/224 |
| 2023/0297923 A1 * | 9/2023 | Dhaygude | | G06N 5/022 |
| | | | | 706/11 |
| 2023/0394988 A1 * | 12/2023 | Yilmaz | | G06T 19/003 |
| 2024/0028413 A1 * | 1/2024 | Bhargava | | G06F 9/5066 |
| 2024/0265827 A1 * | 8/2024 | Giagnocavo | | G06Q 30/016 |
| 2024/0354675 A1 * | 10/2024 | Lane | | G06Q 10/063112 |
| 2024/0412145 A1 * | 12/2024 | Wheeler | | G06Q 10/06398 |

OTHER PUBLICATIONS

M. Zaib et al., "A Short Survey of Pre-trained Language Models for Conversational AI—A New Age in NLP," Association for Computing Machinery, arXiv:2104.10810v1, Apr. 22, 2021, 7 pages.

L. P. Kaelbling et al., "Reinforcement Learning: A Survey," Journal of Artificial Intelligence Research, vol. 4, May 1996, pp. 237-285.

J. Pensar et al., "Labeled Directed Acyclic Graphs: A Generalization of Context-Specfic Independence in Directed Graphical Models," arXiv:1310.1187v1, Oct. 4, 2013, 26 pages.

J. Gao et al., "Neural Approaches to Conversational AI," Foundations and Trends in Information Retrieval, vol. 13, No. 2-3, Feb. 21, 2019, 64 pages.

M. Zaib et al., "Conversational Question Answering: A Survey," arXiv:2106.00874v2, Jun. 3, 2021, 46 pages.

P. Bhagat et al., "Initial Lessons from Building an IVR-based Automated Question-Answering System," International Conference on Information and Communication Technologies and Development, Jun. 17-20, 2020.

Dell Inc., "Dell Compellent Copilot Optimize Service," Copilot Optimize v1.1, Jun. 7, 2012, 7 pages.

Dell Technologies, "Apex," Brochure, Jul. 2020, 9 pages.

Dell Inc., "Dell Compellent Copilot Support," D344 Rev. 2.1, Dec. 2013, 3 pages.

A. Hauser et al., "Characterization and Greedy Learning of Interventional Markov Equivalence Classes of Directed Acyclic Graphs," Journal of Machine Learning Research, vol. 13, Aug. 2012, pp. 2409-2464.

Dell Technologies, "Dell CloudIQ: A Detailed Review," Technical White Paper, Jan. 2022, 159 pages.

P. M. Nadkarni et al., "Natural Language Processing: An Introduction," Journal of the American Medical Informatics Association, vol. 18, No. 5, Sep. 2011, pp. 544-551.

Penn Treebank, "Alphabetical List of Part-of-speech Tags Used in the Penn Treebank Project," https://www.ling.upenn.edu/courses/Fall_2003/ling001/penn_treebank_pos.html, Accessed Jul. 19, 2022, 1 page.

M. Oshry et al., "Voice Extensible Markup Language (VoiceXML) 2.1," https://www.w3.org/TR/2007/REC-voicexml21-20070619/, Jun. 19, 2007, 25 pages.

J. Jablonski, "Natural Language Processing with Python's NLTK Package," https://realpython.com/nltk-nlp-python/, Accessed Jul. 19, 2022, 25 pages.

* cited by examiner

100

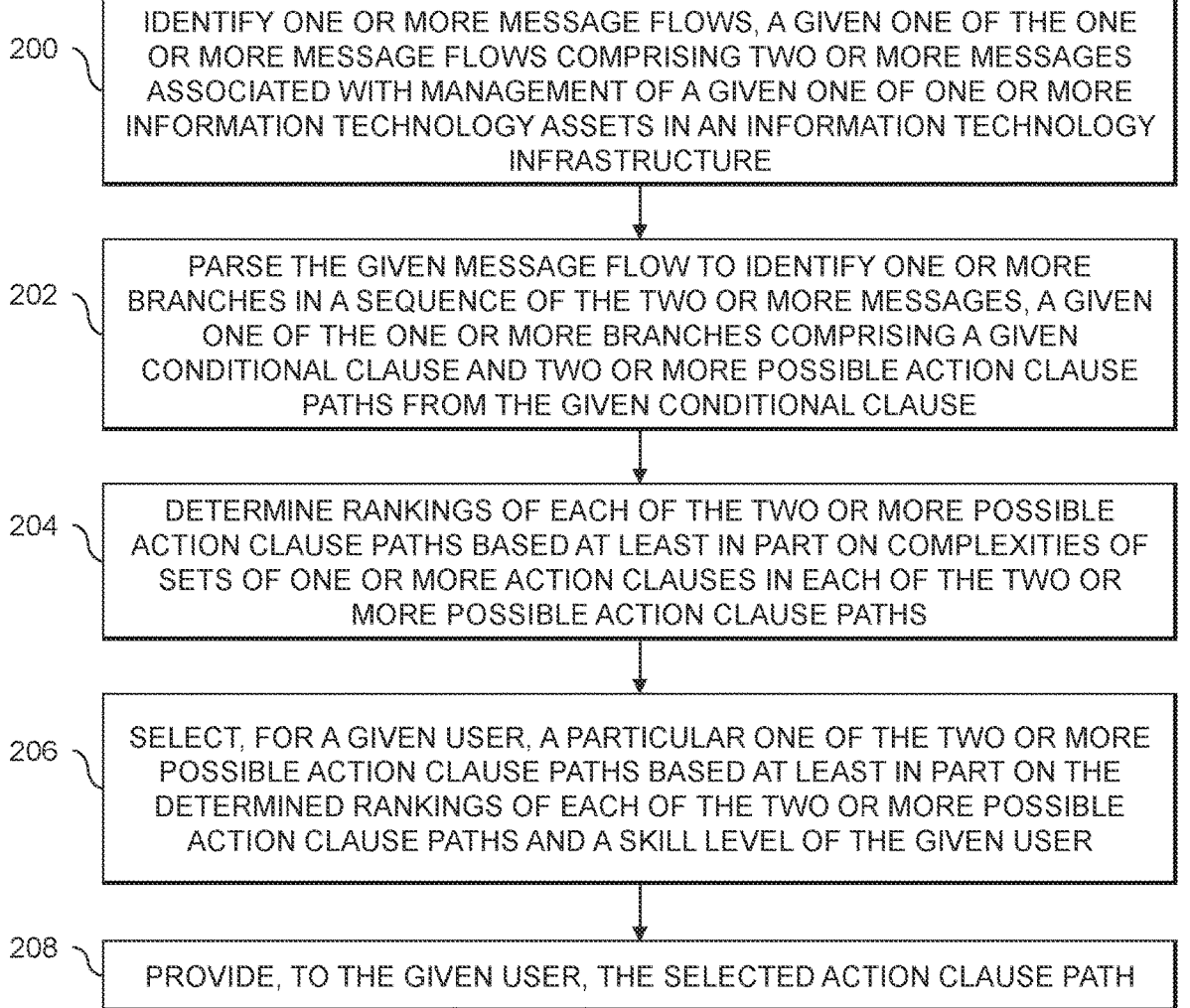

200 — IDENTIFY ONE OR MORE MESSAGE FLOWS, A GIVEN ONE OF THE ONE OR MORE MESSAGE FLOWS COMPRISING TWO OR MORE MESSAGES ASSOCIATED WITH MANAGEMENT OF A GIVEN ONE OF ONE OR MORE INFORMATION TECHNOLOGY ASSETS IN AN INFORMATION TECHNOLOGY INFRASTRUCTURE

202 — PARSE THE GIVEN MESSAGE FLOW TO IDENTIFY ONE OR MORE BRANCHES IN A SEQUENCE OF THE TWO OR MORE MESSAGES, A GIVEN ONE OF THE ONE OR MORE BRANCHES COMPRISING A GIVEN CONDITIONAL CLAUSE AND TWO OR MORE POSSIBLE ACTION CLAUSE PATHS FROM THE GIVEN CONDITIONAL CLAUSE

204 — DETERMINE RANKINGS OF EACH OF THE TWO OR MORE POSSIBLE ACTION CLAUSE PATHS BASED AT LEAST IN PART ON COMPLEXITIES OF SETS OF ONE OR MORE ACTION CLAUSES IN EACH OF THE TWO OR MORE POSSIBLE ACTION CLAUSE PATHS

206 — SELECT, FOR A GIVEN USER, A PARTICULAR ONE OF THE TWO OR MORE POSSIBLE ACTION CLAUSE PATHS BASED AT LEAST IN PART ON THE DETERMINED RANKINGS OF EACH OF THE TWO OR MORE POSSIBLE ACTION CLAUSE PATHS AND A SKILL LEVEL OF THE GIVEN USER

208 — PROVIDE, TO THE GIVEN USER, THE SELECTED ACTION CLAUSE PATH

FIG. 2

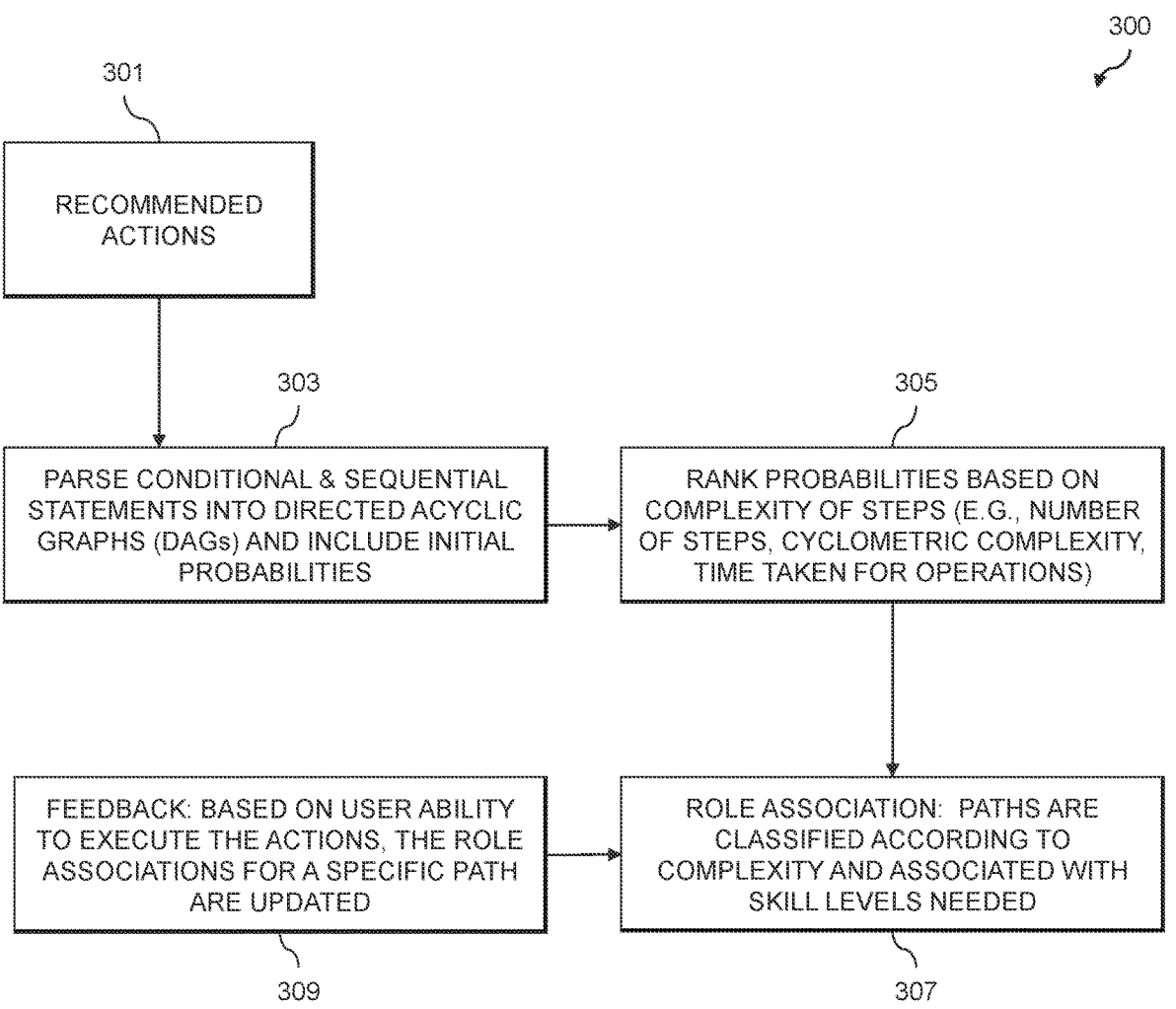

301

RECOMMENDED ACTIONS

303

PARSE CONDITIONAL & SEQUENTIAL STATEMENTS INTO DIRECTED ACYCLIC GRAPHS (DAGs) AND INCLUDE INITIAL PROBABILITIES

305

RANK PROBABILITIES BASED ON COMPLEXITY OF STEPS (E.G., NUMBER OF STEPS, CYCLOMETRIC COMPLEXITY, TIME TAKEN FOR OPERATIONS)

FEEDBACK: BASED ON USER ABILITY TO EXECUTE THE ACTIONS, THE ROLE ASSOCIATIONS FOR A SPECIFIC PATH ARE UPDATED

ROLE ASSOCIATION: PATHS ARE CLASSIFIED ACCORDING TO COMPLEXITY AND ASSOCIATED WITH SKILL LEVELS NEEDED

401 — SAMPLE TRAINING SET OF RESPONSES TO SITUATIONS

403 — ARTIFICIAL INTELLIGENCE (AI)/ MACHINE LEARNING (ML) CLASSIFICATION ALGORITHMS

ROLE CLASSIFICATION MODEL — 405

ANALYZING MESSAGE FLOWS TO SELECT ACTION CLAUSE PATHS FOR USE IN MANAGEMENT OF INFORMATION TECHNOLOGY ASSETS

FIELD

The field relates generally to information processing, and more particularly to management of information processing systems.

BACKGROUND

Support platforms may be utilized to provide various services for managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for analyzing message flows to select action clause paths for use in management of information technology assets.

In one embodiment, an apparatus comprises at least one processing device comprising a processor coupled to a memory. The at least one processing device is configured to perform the steps of identifying one or more message flows, a given one of the one or more message flows comprising two or more messages associated with management of a given one of one or more information technology assets in an information technology infrastructure, and parsing the given message flow to identify one or more branches in a sequence of the two or more messages, a given one of the one or more branches comprising a given conditional clause and two or more possible action clause paths from the given conditional clause. The at least one processing device is also configured to perform the steps of determining rankings of each of the two or more possible action clause paths based at least in part on complexities of sets of one or more action clauses in each of the two or more possible action clause paths, selecting, for a given user, a particular one of the two or more possible action clause paths based at least in part on the determined rankings of each of the two or more possible action clause paths and a skill level of the given user, and providing, to the given user, the selected action clause path.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for analyzing message flows to select action clause paths for use in management of information technology assets in an illustrative embodiment.

FIG. 3 shows a process flow for generating directed acyclic graphs and determining path probabilities within the directed acyclic graphs in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
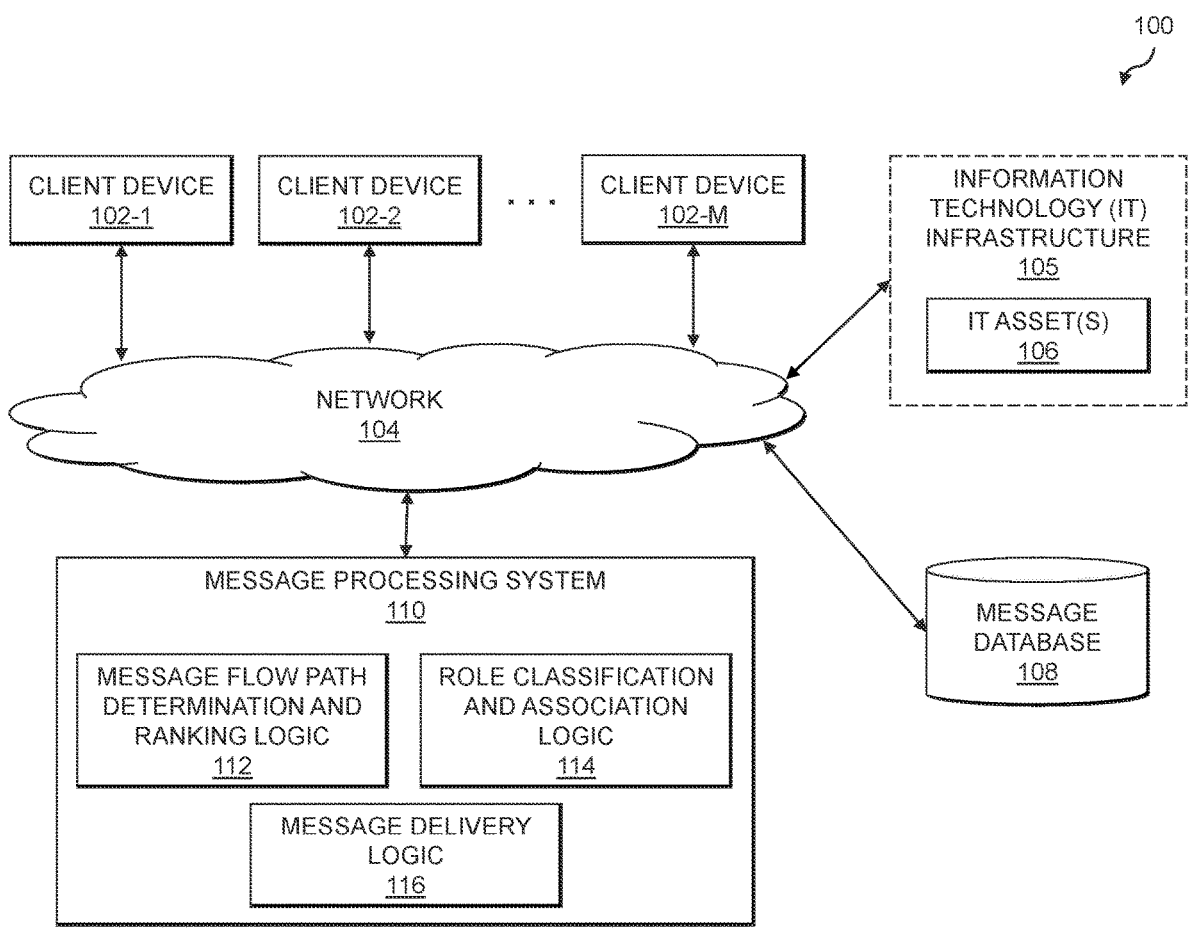
FIG. 1 is a block diagram of an information processing system configured for analyzing message flows to select action clause paths for use in management of information technology assets in an illustrative embodiment.

FIG. 1 shows an information processing system 100 configured in accordance with an illustrative embodiment. The information processing system 100 is assumed to be built on at least one processing platform and provides functionality for analyzing message flows to select action clause paths for use in management of information technology (IT) assets. The system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a message database 108, and a message processing system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102.

The message processing system 110 utilizes various information stored in the message database 108 for guiding intelligent conversational artificial intelligence (AI) that involves user approval and intervention. Such conversational AI may include chats or conversations with computer-generated notifications that include, for example, instructions for performing servicing of the IT assets 106 in the IT infrastructures 105. In some embodiments, the message processing system 110 is used for an enterprise system. For example, an enterprise may subscribe to or otherwise utilize the message processing system 110 for processing computer-generated notifications (e.g., generated by ones of the IT assets 106) within conversational AI chats or conversations. The conversational AI chats or conversations are then provided to target users (e.g., of client devices 102) for playback to facilitate servicing of the IT assets 106.

As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The message database 108, as discussed above, is configured to store and record various information that is used by the message processing system 110 in processing computer-generated notifications for intelligent guided conversational AI (e.g., for use in testing the IT assets 106, applications or other software running on the IT assets 106, etc.). Such information may include, but is not limited to, information regarding previously processed messages or notifications, dictionaries or other data stores for processing jargon and simplifying terms in the computer-generated notifications, etc. The message database 108 in some embodiments is implemented using one or more storage systems or devices associated with the message processing system 110. In some embodiments, one or more of the storage systems utilized to implement the message database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the message processing system 110, as well as to support communication between the message processing system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., including performing testing, configuration, servicing or other management of the IT assets 106, or of applications or other software that runs on the IT assets 106). For example, a given one of the client devices 102 may be operated by a user to access a graphical user interface (GUI) provided by the message processing system 110 to manage processing of computer-generated notifications into intelligent guided conversational AI. The message processing system 110 may be provided as a cloud service that is accessible by the given client device 102 to allow the user thereof to manage processing of computer-generated notifications into intelligent guided conversational AI. In some embodiments, the IT assets 106 of the IT infrastructure 105 are owned or operated by the same enterprise that operates the message processing system 110 (e.g., where an enterprise such as a business provides support for the assets it operates). In other embodiments, the IT assets 106 of the IT infrastructure 105 may be owned or operated by one or more enterprises different than the enterprise which operates the message processing system 110 (e.g., a first enterprise provides support for assets that are owned by multiple different customers, business, etc.). Various other examples are possible.

In some embodiments, the client devices 102 and/or IT assets 106 may implement host agents that are configured for automated transmission of information for use in guiding conversational AI. Such host agents may also or alternatively be configured to automatically receive from the message processing system 110 messages for output in conversational AI systems. It should be noted that a "host agent" as this term is generally used herein may comprise an automated entity, such as a software entity running on a processing device. Accordingly, a host agent need not be a human entity.

The message processing system 110 in the FIG. 1 embodiment is assumed to be implemented using at least one processing device. Each such processing device generally comprises at least one processor and an associated memory, and implements one or more functional modules or logic for controlling certain features of the message processing system 110. In the FIG. 1 embodiment, the message processing system 110 comprises message flow path determination and ranking logic 112, role classification and association logic 114, and message delivery logic 116. The message flow path determination and ranking logic 112 is configured to parse message flows involving branches to generate one or more directed acyclic graphs (DAGs) with multiple paths (e.g., splitting conditional and action clauses in the message flows). The message flow path determination and ranking logic 112 is further configured to generate rankings of such multiple paths (e.g., rankings of different paths taken for resolving an issue). The role classification and association logic 114 is configured to classify the role of a user taking part in the guided conversational AI chat, where the roles are associated with different skill levels. The message delivery logic 116 is configured to deliver messages within the guided conversational AI chat with recommended actions (e.g., selected based on the path rankings and the skill level of a target user determined from the target user's associated role). In some embodiments, the messages within the conversational AI may be subject to various preprocessing (e.g., replacing technical jargon with simpler terms, simplifying nouns or other object terms in the messages into more human-friendly terms, converting the content of messages into statements or sentences in imperative form with simple action steps to be taken, etc.).

It is to be appreciated that the particular arrangement of the client devices 102, the IT infrastructure 105 and the message processing system 110 illustrated in the FIG. 1 embodiment is presented by way of example only, and alternative arrangements can be used in other embodiments. As discussed above, for example, the message processing system 110 (or portions of components thereof, such as one or more of the message flow path determination and ranking logic 112, the role classification and association logic 114, and the message delivery logic 116) may in some embodiments be implemented internal to one or more of the client devices 102 and/or the IT infrastructure 105.

At least portions of the message flow path determination and ranking logic 112, the role classification and association logic 114, and the message delivery logic 116 may be implemented at least in part in the form of software that is stored in memory and executed by a processor.

The message processing system 110 and other portions of the system 100, as will be described in further detail below, may be part of cloud infrastructure.

The message processing system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the message database 108 and the message processing system 110 or components thereof (e.g., the message flow path determination and ranking logic 112, the role classification and association logic 114, and the message delivery logic 116) may be implemented on respective distinct processing platforms, although numerous other arrangements are possible. For example, in some embodiments at least portions of the message processing system 110 and one or more of the client devices 102, the IT infrastructure 105 and/or the message database 108 are implemented on the same processing platform. A given client device (e.g., 102-1) can therefore be implemented at least in part within at least one processing platform that implements at least a portion of the message processing system 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the IT infrastructure 105, IT assets 106, the message database 108 and the message processing system 110, or portions or components thereof, to reside in different data centers. Numerous other distributed implementations are possible. The message processing system 110 can also be implemented in a distributed manner across multiple data centers.

Additional examples of processing platforms utilized to implement the message processing system 110 and other components of the system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for analyzing message flows to select action clause paths for use in management of IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for analyzing message flows to select action clause paths for use in management of IT assets will now be described in more detail with reference to the flow diagram of FIG. 2. It is to be understood that this particular process is only an example, and that additional or alternative processes for analyzing message flows to select action clause paths for use in management of IT assets may be used in other embodiments.

In this embodiment, the process includes steps 200 through 208. These steps are assumed to be performed by the message processing system 110 utilizing the message flow path determination and ranking logic 112, the role classification and association logic 114, and the message delivery logic 116. The process begins with step 200, identifying one or more message flows. A given one of the one or more message flows comprises two or more messages associated with management of a given one of the IT assets 106 in the IT infrastructure 105.

In step 202, the given message flow is parsed to identify one or more branches in a sequence of the two or more messages. A given one of the one or more branches comprises a given conditional clause and two or more possible action clause paths from the given conditional clause. Step 202 may comprise generating a DAG comprising nodes representing the given conditional clause and one or more other conditional clauses in the sequence of the two or more messages. Step 202 may further comprise building a Markov chain by associating probabilities of occurrence with the two or more possible action clause paths in the generated DAG. The probabilities of occurrence associated with the two or more possible action clause paths may be updated based at least in part on monitoring actions performed by the given user on the given IT asset.

Rankings of each of the two or more possible action clause paths are determined in step 204 based at least in part on complexities of sets of one or more action clauses in each of the two or more possible action clause paths. Step 204 may comprise determining rankings of action clauses in a given one of the sets of one or more action clauses in a given one of the two or more possible action clause paths. The ranking for the given action clause path may comprise a cumulative ranking based at least in part on the determined rankings of the action clauses in the given set of one or more action clauses in the given action clause path. The cumulative ranking for the given action clause path may be based at least in part on a cyclometric complexity of the action clauses in the given set of one or more action clauses in the given action clause path. The complexity of the action clauses in the given set of one more action clauses in the given action clause path may be determined based at least in part on at least one of: ease of operation of the action clauses in the given set of one or more action clauses; a number of the action clauses in the given set of one or more action clauses; and a time taken for the action clauses in the given set of one or more action clauses.

The FIG. 2 process continues with step 206, selecting, for a given user (e.g., associated with a given one of the client devices 102, such as client device 102-1), a particular one of the two or more possible action clause paths based at least in part on the determined rankings of each of the two or more possible action clause paths and a skill level of the given user. In step 208, the selected action clause path is provided to the given user (e.g., to the client device 102-1). The selected action clause path may be provided to the given user in an AI guided conversation system. The skill level of the given user may be determined based at least in part on analyzing responses of the given user in the artificial intelligence guided conversation system. In some cases, the skill level of the given user is dynamically determined and updated based at least in part on analyzing responses of the given user in the AI guided conversation system. Potential failure of one or more action clauses in the selected action clause path may be predicted based at least in part on analyzing responses of the given user in the AI guided conversation system. This may include analyzing historical traversal of the selected action clause path, by at least one of the given user and one or more other users, to select one or more additional action clauses to add to the selected action clause path. Analyzing the historical traversal of the selected action clause path may comprise performing sentiment analysis associated with user responses of said at least one of the given user and the one or more other users in the AI guided conversation system to select the one or more additional action clauses to be added to the selected action clause path.

Currently, artifacts, notifications or other messages related to business processing and infrastructure management (e.g., message guides, recommended actions, recovery steps, business processes, escalation procedures, error messages and handling, computer-generated notifications, etc.) are all assumed to be read by humans. Thus, even with significant machine-level automation being performed inside a data center or other portion of IT infrastructure, there are many situations which still require manual human intervention.

Illustrative embodiments provide technical solutions for minimizing or reducing the need for such manual human intervention to the greatest degree possible, while keeping the sense of urgency and closure towards a desired intent to achieve desired goals as demonstrated by humans in resolving issues. When manual human intervention is required, the technical solutions described herein provide approaches for making messages or notifications to the user as clear and unambiguous as possible for the user performing the manual human intervention. This may include, for example, ensuring that messages be imperative rather than declarative or informational, reducing the usage of jargon and ambiguous words and actions, etc. The technical solutions described herein further seek manual human intervention in such a way that the manual human intervention involves just enough (e.g., as little as possible) decision making and/or action from the user performing the manual human intervention. In these cases, it is assumed that a system has the knowledge of what needs to be done in order to guide the user towards successful resolution of issues.

Automation, when possible, still often requires input and direction from humans. Also, certain decisions have financial and legal implications such that human consent may be critical. In some cases, automation gets stuck with equally probable paths, and requires additional insight from users to decide which path to take. Illustrative embodiments provide technical solutions for handling various types of situations, including: where a machine needs approval or consent from a human; where a machine has identified multiple options and needs a human operator to make a selection; where a machine is seeking additional information from a human to identify potential operations; where a machine is handling an error situation which has multiple possible paths (e.g., including potentially multiple paths with equal probability) and needs help from a human to take a next subsequent action; where a machine does not have the knowledge or expertise to go to the next step and needs human help; etc. To handle these and other situations, the technical solutions described herein provide an active conversational medium that is not impacted by accompanying noise in the system. For example, audio mechanisms may be highly influenced by surrounding noise and thus are not good for these scenarios. Videos may be better, but when there is a need for verbal information, videos suffer from the same deficiencies as audio mechanisms. With the advent of social media and chat bots, users are becoming comfortable making decisions and responding to chats immediately. The technical solutions described herein can leverage such mechanisms to quickly respond to adverse situations. It should be noted that the technical solutions described herein are not limited to use within social media platforms or using chat bots. These mechanisms may be emulated on other systems, such as email, short message system (SMS), etc. More generally, the technical solutions described herein may be used in guiding conversational AI chats.

The technical solutions described herein provide mechanisms for converting notifications or messages into conversational actions. This approach is applicable for various complex or ambiguous processes which could have multiple paths to resolution or solution (e.g., planning a schedule, restarting a server by different means, etc.). While some paths may be independent, others paths may be conditional in nature (e.g., from the recommended actions of Server Catalog and Burn Factory events, roughly 15% fall into this category where context information is required to alter the path of resolution).

In some embodiments, message flows (e.g., collected from message notifications, recommendations, message catalogs, etc.) that involve branches (e.g., "if < . . . >, then < . . . >", "when < . . . >, then < . . . >", etc.) fall into the category where context information or human intervention may be needed for resolution. In these cases, the conditional clauses and action clauses are split to generate DAGs. Because there are multiple paths possible, each node of the DAG will be a conditional clause. From these, multiple paths flow out each representing the action clauses for particular values or conditions. This is built into a Markov Chain process by associating probabilities of occurrences for each path as the next step. It should be noted that sequential execution is not necessarily the case (though sequential execution of multiple actions may occur between different nodes in the DAG representing conditional clauses with multiple possible action clauses), and it is assumed that at least some of the nodes in the DAG have multiple branches which processing may take. Thus, a determination must be made as to whether a step needs to be executed or not. Each action may be associated with a tag (e.g., "human" for actions which require manual human intervention, "script" for actions that may be automated via one or more tools, and "automatable" for actions that do not require manual human intervention). If there are actions which involve multiple such tags, such actions should be split in such a way that the human, script and automatable actions are separated in sequence.

DAGs with Markov Chain processes are created which involve different paths taken for resolving an issue. Initially, an equal probability of occurrence may be associated with each of the nodes in the DAG. If a priori probabilities or possibilities are known or available, they may be used. If new paths are taken by users (e.g., as determined through analyzing historical troubleshooting or ticketing steps) they may be included in the DAGs, with the probabilities being adjusted accordingly.

The paths within the DAGs are then ranked. Ranking may be performed for each step based on various aspects (e.g., ease of operation, cyclometric complexity of the script, number of steps involved in that operation, time taken for the operation, etc.). Paths may be ranked based on the cumulative ranks of the steps in those paths and the probability of success via the different paths. Future recommendations will consider both the probability of success and the path rank. Look ahead analysis is performed in some embodiments to check whether there is a possibility of rejection, if the process will result in failure, etc. This may involve checking whether additional inputs are needed, and whether there is a potential for recommended actions to get rejected. Based on this, the results are initially presented to the user and, if additional inputs are needed, they are collected from the user.

The technical solutions described herein may also utilize a role classification engine to identify the roles of different users. Based on the action to be performed by the user, the role classification engine will identify the role of the user and classify the user as belonging to one or more user groups. Such role classification may be based at least in part on user activity performed for certain actions, in response to detecting various events, etc. Based on this and other information, users may be classified into user groups (e.g., developer, manager, product manager, executive, etc.). The DAGs thus go through continuous learning and updates.

As noted above, the technical solutions described herein enable conversion of computer-generated notifications or other messages that need human intervention into actionable messages in conversational chats (e.g., guided conversational AI). This advantageously solves various technical problems, including that notifications or other messages, as well as resolution steps, may not be written as action friendly messages. Long messages, phrases and complex structures that involve context are difficult to choreograph into a conversation sequence, and need various preprocessing to be converted into proper conversations. In addition, notifications or messages, and their associated resolution steps, are not separated into human intervention tasks and automatable tasks. Some resolutions may also involve both human intervention and automatable tasks. Currently, resolution steps are provided as complex recommendations that can be interpreted by humans only. The technical solutions described herein in some embodiments also provide mechanisms for extracting the resolution steps separately and for sequencing them into conversation mode.

Technical challenges are also presented in that some of the resolutions or recommendations require branching situations based on the context of the situation and the target user. For example, a remote user may need a laptop to be shipped remotely and hence the shipping address is needed, whereas a local user may want to take the laptop and needs to schedule a meeting with facilities. The path for resolution depends on some of these intermediate inputs. In some cases, approval flows also require certain conditions to be met. For example, certain fields may need to be met in certain conditions. Sometimes, these flows get rejected and need to be resubmitted with whatever information was lacking. This results in multiple iterations of approvals causing delays in execution flows. Machines may also need approval from humans for certain important events, which is currently not baked into offline situations (e.g., where a user does not have access to a laptop or other connected device). Further, most recommendations are not amenable to chat-level interactions which require small and quick interactions. Thus, pre-processing is required to create optimal conversation paths.

In some embodiments, various infrastructure elements are built for the purpose of generating guided conversational artificial intelligence (AI), including: path probabilities and DAGs; look-ahead parametric needs; and a role classification engine. For messages, notifications, recommended actions and other artifacts, path probabilities and DAGs are created. This may be done by analyzing message flows (e.g., collected from message notifications, recommendations, message catalogs, etc.) that involve branches (e.g., "if < . . . >, then < . . . >"; "when < . . . >, then < . . . >"; etc.). For such message flows, the conditional clauses and the action clauses are split. The message flows are then created as DAGs. Because there are multiple possible paths, each node of the DAG will be a conditional clause from which multiple paths flow out each representing one of the action clauses for a particular value of that conditional clause. This is built into a Markov Chain process by associating probabilities of occurrences for each path as the next step. It should be noted that some nodes of the DAG may only have one path, but it is assumed that most (and in some cases, all) nodes in the DAG have multiple branches to figure out if steps need to be executed or not. As noted above, the actions or action clauses may be associated with tags (e.g., "human," "script," "automatable," etc.). If there are actions or action clauses which involve multiple such tags, they are split in such a way that the human, script and automatable actions are separated in sequence.

The DAGs with Markov Chain processes are created, which involve different paths taken for resolving an issue. Initially, an equal probability of occurrence may be associated with each node in the DAG. If a priori probabilities are known or available, these may be used instead of setting the initial probabilities of occurrence equal to one another. If new paths are taken by users (e.g., as determined through analysis of historical troubleshooting or ticketing data), these may be added into the DAGs, with probabilities of the paths being updated or adjusted accordingly to reflect the status.

Paths within the DAGs are then ranked. Ranking may be done for each step or action based on various features or characteristics. Such features or characteristics may include, but are not limited to: ease of operation; cyclometric complexity of the script; number of steps involved in an operation; time taken for an operation; etc. Generally, simpler, lower complexity and faster operations are awarded higher rank than complex or slower operations. Paths are ranked based on the cumulative ranks of the steps or actions in that path, and the paths' associated probability of success. Future recommendations will consider both the probability of success and the path rank. Paths with different levels of complexity will be associated with different skill levels of the users. Over a period of time, this classification may be updated. For example, if higher skill users are unable to perform the specific tasks in a path and need supervisory attention, then the skill level of the path may be modified. This can be traced as part of the chat. Thus, the DAGs can go through continuous learning and updates.

FIG. 3 shows a process flow 300 for generating DAGs and path probabilities in the DAGs. To begin, a set of recommended actions 301 is provided as input. In block 303, conditional and sequential statements in the recommended actions 301 are parsed into DAGs including initial probabilities as described above. In block 305, probabilities of the paths are ranked based on the complexity of steps and other characteristics or features (e.g., the number of steps, cyclometric complexity, time taken for operations, etc.). In block 307, role association is performed. The block 307 processing includes classifying paths according to their complexity and associated user skill level needed. Feedback is provided in block 309. The block 309 feedback may include updating the role associations for different paths based on user ability to execute the actions in the paths.

In some embodiments, a lookahead parametric needs table is used. The lookahead parametric needs table looks at the past historical traversals of the DAGs, and collects all the success, failure, rejected and approved events (e.g., including messages and comments attached to such artifacts). The comments associated with such actions are also collected separately. The system will try to look for certain aspects (e.g., names, terms, verbs, etc.) to determine what is missing. For example, the comment or message "Email approval is not attached. Please attach and resubmit" will indicate that an attachment that is in the form of email approval is required. This will be added as a necessary step for this path to take place. In addition, the system can look for terms like "resubmit" to determine that this data was missing and can be reinitiated, or terms like "rejected" to determine that despite attachment this will be rejected. As another example, a comment or message such as "this will not work for Brand A drive" would be analyzed to look for matching information in existing jargon processing dictionaries. If "Brand A" is found in the jargon processing dictionaries, then that specific name designation is added as an important item that will be included in future requests. Needs sentiment analysis may be applied to each statement to see if it is positive or negative, and potentially other types of sentiments (e.g., not necessary but good). This is used to classify the relevant details into various categories such as needed, not needed, good to have, etc. In needs sentiment analysis, a focus is to identify if keywords indicate whether there are additional needs, needs satisfied or potential denial of the activity. The lookahead parametric needs table may be generated manually, through machine learning of historical analysis of failure, combinations thereof, etc.

Figure 4:
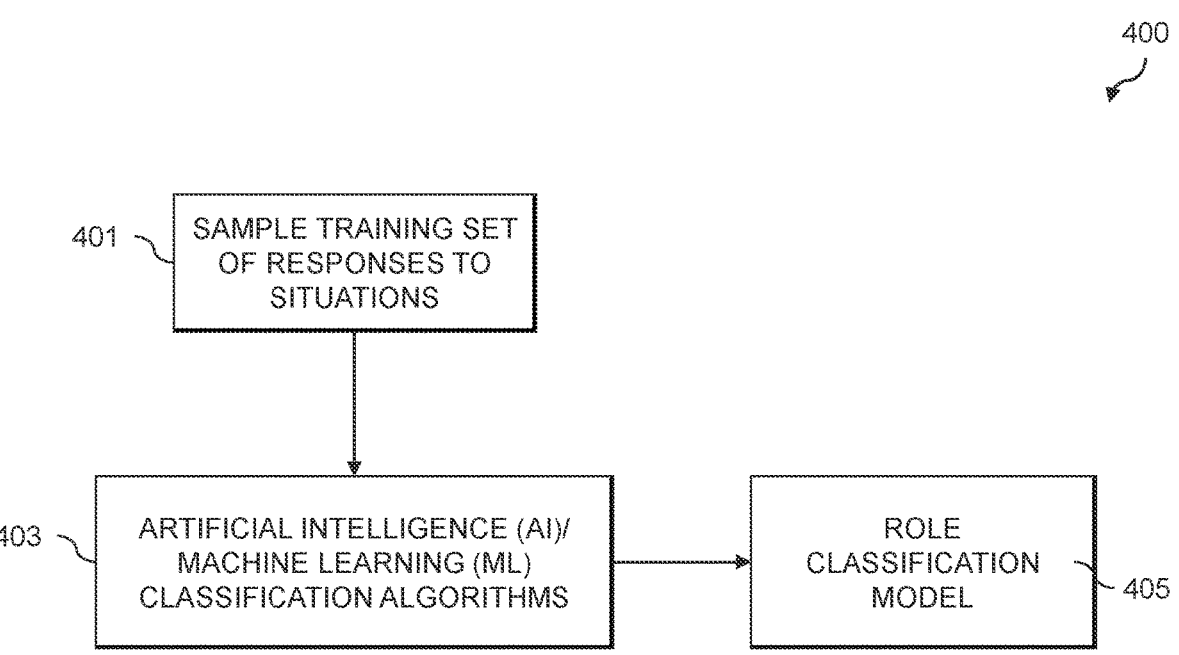
FIG. 4 shows a process flow for role classification in an illustrative embodiment.

Role classification will now be described in further detail. A role classification engine may be configured to review answers from users and to classify the users based on their responses. The role classification engine may continuously monitor responses and review the words in the responses using one or more role classification models (e.g., trained with "known" roles) to assess the skill level of the users. Role classification models may be created using various machine learning algorithms which are trained using a set of traditional responses of users to various questions. It is possible that during the course of a conversation, the role classification engine might see the skill level of a user changing across different statements (e.g., some simple statements may indicate a low skill user, whereas a specific question like "when did it happen?" may indicate a management user, etc.). In some embodiments, the role classification engine takes the highest skill level among the statements in a conversation and uses that to identify the role of a given user. In other embodiments, the role classification engine may use other approaches for identifying the role of the given user (e.g., the most frequent skill level among the statements in the conversation, the lowest skill level among the statements in the conversation, etc.). FIG. 4 shows a process flow 400 for a role classification engine. A sample training set 401 of responses to situations is provided as input to processing block 403. In block 403, one or more AI/ML classification algorithms are trained using the sample training set 401 to produce a role classification model 405.

Message play and delivery will now be described. Conversational AI (e.g., through various chat applications) works well when there are multiple branches of recovery, with the system or machine needing to select the right one. For single user interaction, a DAG corresponding to a current message in the chat conversation is selected. The lookahead parametric needs table is consulted to see if all the needed parameters are provided. In case there are one or more parameters that need to be filled, the machine may automatically reject a request and revert or respond with a request that the missing needed parameters be filled (e.g., where the needed parameters must be filled before the request can be handled by the machine).

All sequential paths until a branch of "human" tasks is encountered are then executed by the machine. When a branch is reached, the machine may perform the following: select the course of action with the highest rank; present the options to the user and associate the options with the ranks; based on the user selection, proceed with the selected option; and ask for information from the user based on context (e.g., why Continuous Integration and Continuous Delivery (CI/CD) scores are down for a particular platform), with the machine parsing certain responses to map to predefined scenarios to assist in decision-making.

In some embodiments, the system assigns a severity to each action category, defining which actions may be automated, which actions require human intervention and/or approval, etc. The system may also estimate the time by which actions should be taken. After this, the machine continues with the path until the end is reached. In case one of the paths fail, then that segment is backtracked to the most recent branch and the next ranking path is taken. If there are no more paths available on this branch, then the machine goes backward until the most recent branch before the current branch. The entire process continues until the end is reached or there are no more paths to traverse. In the latter case, the machine may raise an escalation to a human expert indicating that it cannot handle the current notification and aborts processing.

Some additional variations which may be used in some embodiments include: lookahead prediction in case of rejection in a workflow; rejection and asking for information that happens during the workflow; rejection and asking for information that happens at the start of the workflow; root cause prediction for intelligent rollback of a workflow to an optimal point (e.g., which may use AI/ML for prediction of the failure point); recognizing the right stage to ask for information (e.g., delay asking for information until it is close to the point where the information is needed); recognizing at which stage information should be collected (e.g., ask simultaneously to different applications at the same time); etc.

The level of detail to be presented to the user during a particular chat or conversation may vary, such as based on the skill level or role of the user. For a "need to know" or "higher authority basis" role, more details may be obtained for business level decision making (e.g., involving time, effort, next potential action, etc.). For "low skill" (e.g., manager) versus "high skill" (e.g., technologist) roles, more details on context may be provided for low skill users to help such users' understanding, whereas high skill users may be given the actual problem in a crisp and succinct manner. For a "developer" role, more context may be provided on the technical details that will be useful for debugging (e.g., collect logs and provide them). The level of detail may also include providing an initial hypothesis of the problem (e.g., a user interface bug).

Figure 5:
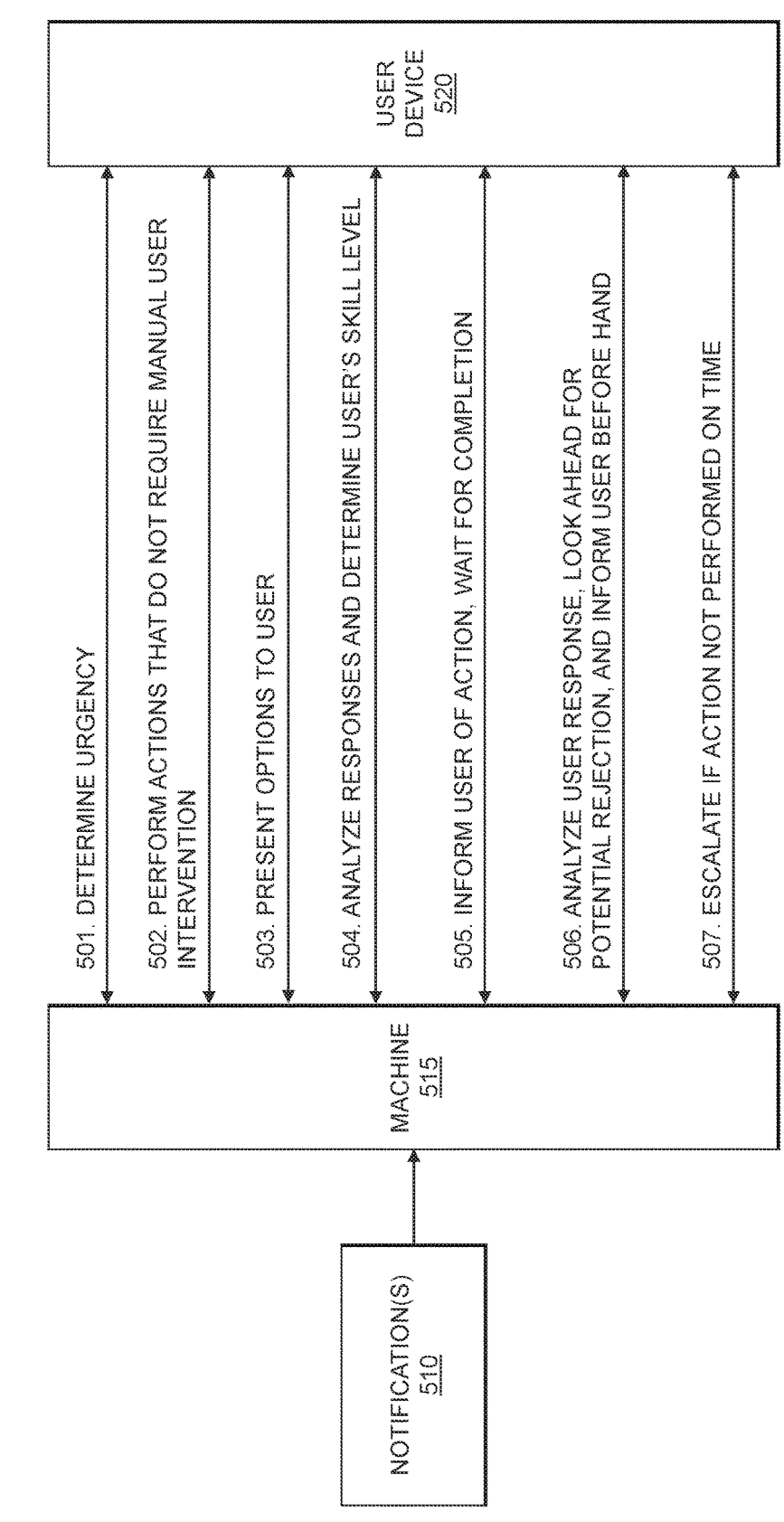
FIG. 5 shows a process flow for handling notifications using conversational artificial intelligence in an illustrative embodiment.

FIG. 5 shows a process flow 500 for execution of a conversational AI chat for one or more input notifications 510, with the conversational AI chat taking place between a machine 515 (e.g., that is to be serviced) and a user device 520 (e.g., of a user responsible for servicing the machine 515). In step 501, the machine 515 determines and communicates an urgency (e.g., a "need-by" time or ETA for responding to the notifications 510) to the user device 520. The machine 515 in step 502 performs actions that do not need user intervention (e.g., until a branch in the DAG is reached). Once a branch in the DAG is reached, the machine 515 in step 503 presents options to the user device 520 (e.g., rankings of the different paths that may be followed from that branch). In step 504, the machine 515 analyzes user responses in the chat to determine the user's skill level (e.g., which may be used to update or adjust the options presented and/or the content of messages sent to the user during the conversation). In step 505, the machine 515 informs the user device 520 of a recommended action and waits for the user of the user device 520 to complete that recommended action. In step 506, the machine 515 analyzes the response(s) in the chat to look ahead for potential rejection or failure, and to inform the user beforehand. In step 507, the machine 515 escalates (e.g., to a higher level user) if actions are not performed on time, if all paths of the DAG are exhausted and issues still exist, etc.

For group interactions, messages in a chat or conversion are sent to a group of users (e.g., a group message). The system may: (1) determine the primary person or user accountable for performing recommended actions (e.g., a manager or user with sufficient privileges to perform the recommended actions); (2) determine a backup person or user accountable for performing the recommended actions; and (3) wait until one of the members of the group "owns" or claims responsibility for performing the recommended actions. As a result of (1)-(3), a target user for a particular recommended action is selected. Thereafter, the group interaction in essence becomes a single user conversation with the target user. It should be noted that the target user may switch throughout the chat or conversation. In some embodiments, the system implements a chatbot or interactive voice response (IVR) where the system goes through some standard sequence (e.g., based on human direction). However, the system figures out who particular calls (e.g., recommended actions) should go to and then directs messages in the chat directly to the target users.

The technical solutions described herein provide various advantages in processing data in various technology spaces that use technical terms in notifications or messages. Conventional approaches, however, do not understand the semantics of those terms. This forces messages relayed by machines to require necessary manual intervention. The technical solutions described herein enable separation of machine tasks from human tasks, and for sequencing tasks. Options are presented to users based on the probability of occurrence, using a novel algorithm for ranking based on machine-automated analysis of the steps, scripts, usage patterns and other artifacts, and for using such analysis to update Markov Chain processes for DAGs. The technical solutions described herein further collect information in advance based on user request prediction. Need sentiment analysis is used for analyzing additional parameters (e.g., from past resolved messages) that are used to assess the completeness of requests and for helping to collect them early on or at an appropriate time rather than letting the user go through multiple complete cycles of rejection. The technical solutions described herein also enable context-based inquiry (e.g., from a machine towards a human operator), and mapping of context responses by humans to known situations and allowing the system to make decisions accordingly. In some embodiments, automated response learning based on context and person may be used for similar situations.

The technical solutions described herein enable an organization or other enterprise to improve the productivity of its employees or other users. The technical solutions can be deployed across a variety of products, including support products that provide support for service engineers in data centers. Such support products may include cloud-based support tools.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for analyzing message flows to select action clause paths for use in management of IT assets will now be described in greater detail with reference to FIGS. 6 and 7. Although described in the context of system 100, these platforms may also be used to implement at least portions of other information processing systems in other embodiments.

Figure 6:
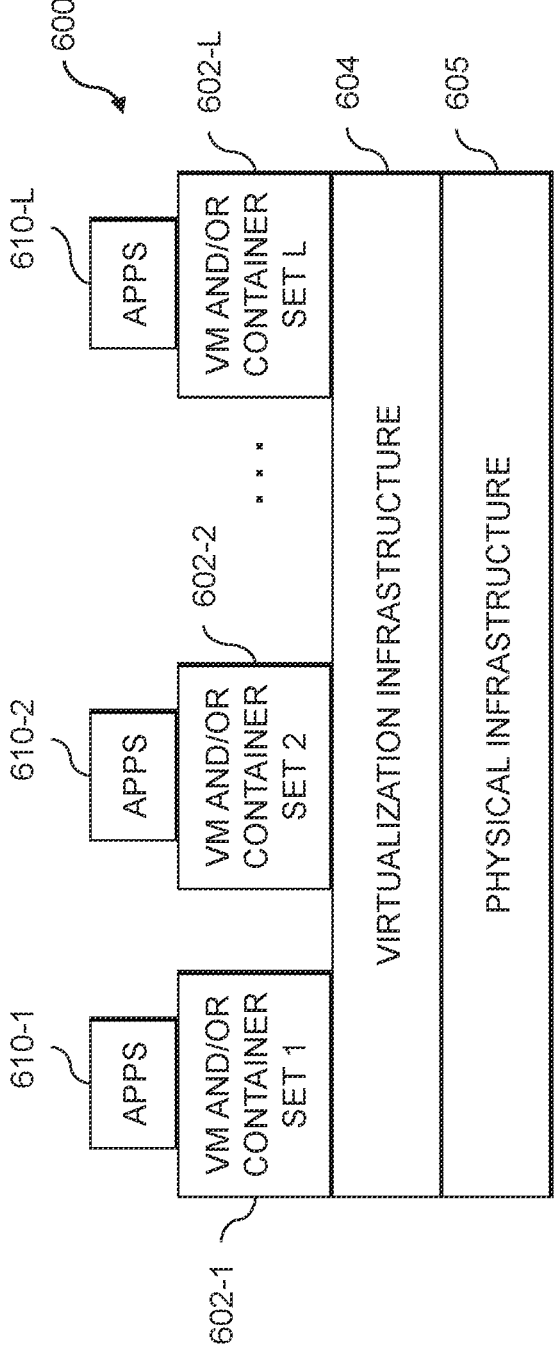
FIGS. 6 and 7 show examples of processing platforms that may be utilized to implement at least a portion of an information processing system in illustrative embodiments.
Figure 7:
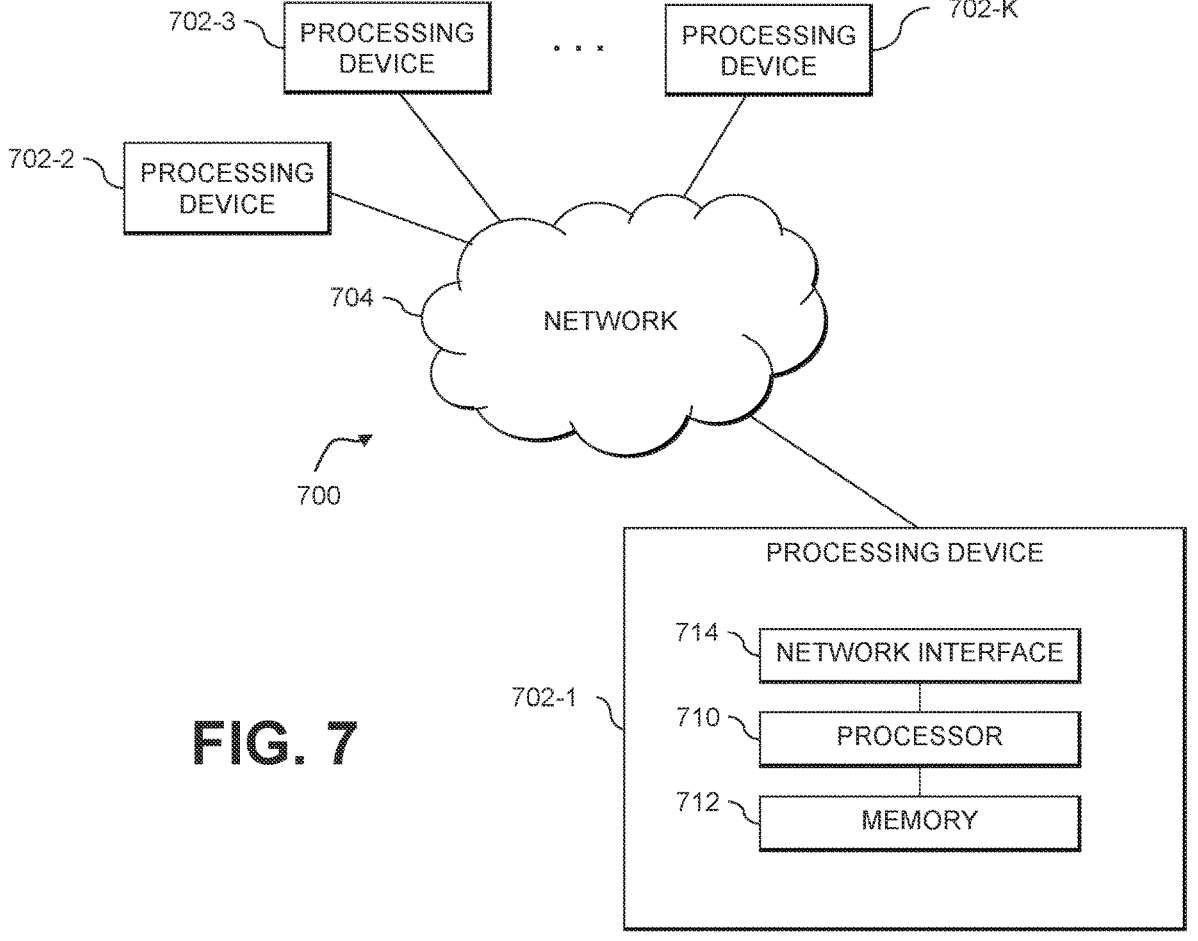

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for analyzing message flows to select action clause paths for use in management of IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, messages, notifications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device implementing an artificial intelligence guided conversation system, the at least one processing device being configured to perform steps of:

training a machine learning model of the artificial intelligence guided conversation system to perform role classification for users interacting with the artificial intelligence guided conversation system;

identifying one or more message flows in the artificial intelligence guided conversation system that are associated with a given user, a given one of the one or more message flows comprising two or more messages associated with management of a given one of one or more information technology assets in an information technology infrastructure;

determining, by parsing responses of the given user in the one or more message flows utilizing the machine learning model of the artificial intelligence guided conversation system, a skill level of the given user;

parsing the given message flow to identify one or more branches in a sequence of the two or more messages, a given one of the one or more branches comprising a given conditional clause and two or more possible action clause paths from the given conditional clause;

determining rankings of each of the two or more possible action clause paths based at least in part on complexities of sets of one or more action clauses in each of the two or more possible action clause paths;

selecting, for the given user, a particular one of the two or more possible action clause paths based at least in part on the determined rankings of each of the two or more possible action clause paths and the determined skill level of the given user; and providing, to the given user via the artificial intelligence guided conversation system, the selected action clause path.

2. The apparatus of claim 1 wherein parsing the given message flow comprises generating a directed acyclic graph comprising nodes representing the given conditional clause and one or more other conditional clauses in the sequence of the two or more messages.

3. The apparatus of claim 2 wherein parsing the given message flow further comprises building a Markov chain by associating probabilities of occurrence with the two or more possible action clause paths in the generated directed acyclic graph.

4. The apparatus of claim 3 wherein the at least one processing device is further configured to perform the step of updating the probabilities of occurrence associated with the two or more possible action clause paths based at least in part on monitoring actions performed by the given user on the given information technology asset.

5. The apparatus of claim 1 wherein determining the ranking of a given one of the two or more possible action clause paths comprises determining rankings of action clauses in a given one of the sets of one or more action clauses in the given action clause path.

6. The apparatus of claim 5 wherein the ranking for the given action clause path comprises a cumulative ranking based at least in part on the determined rankings of the action clauses in the given set of one or more action clauses in the given action clause path.

7. The apparatus of claim 6 wherein the cumulative ranking for the given action clause path is based at least in part on a cyclometric complexity of the action clauses in the given set of one or more action clauses in the given action clause path.

8. The apparatus of claim 5 wherein a complexity of the action clauses in the given set of one more action clauses in the given action clause path is determined based at least in part on at least one of:

ease of operation of the action clauses in the given set of one or more action clauses;

a number of the action clauses in the given set of one or more action clauses; and a time taken for the action clauses in the given set of one or more action clauses.

9. The apparatus of claim 1 wherein the at least one processing device is further configured to perform the step of dynamically updating the determined skill level of the given user based at least in part on parsing additional responses of the given user in one or more additional message flows in the artificial intelligence guided conversation system.

10. The apparatus of claim 1 wherein the at least one processing device is further configured to perform the step of analyzing historical traversal of the selected action clause path, by at least one of the given user and one or more other users, to select one or more additional action clauses to add to the selected action clause path.

11. The apparatus of claim 10 wherein analyzing the historical traversal of the selected action clause path comprises performing sentiment analysis associated with user responses of said at least one of the given user and the one or more other users in the artificial intelligence guided conversation system to select the one or more additional action clauses to be added to the selected action clause path.

12. The apparatus of claim 1 wherein the at least one processing device is further configured to perform the step of predicting potential failure of one or more action clauses in the selected action clause path based at least in part on analyzing the responses of the given user in the artificial intelligence guided conversation system.

13. A computer program product comprising a non-transitory processor-readable storage medium having stored therein program code of one or more software programs, wherein the program code when executed by at least one processing device implementing an artificial intelligence guided conversation system causes the at least one processing device to perform steps of:

training a machine learning model of the artificial intelligence guided conversation system to perform role classification for users interacting with the artificial intelligence guided conversation system;

identifying one or more message flows in the artificial intelligence guided conversation system that are associated with a given user, a given one of the one or more message flows comprising two or more messages associated with management of a given one of one or more information technology assets in an information technology infrastructure;

determining, by parsing responses of the given user in the one or more message flows utilizing the machine learning model of the artificial intelligence guided conversation system, a skill level of the given user;

parsing the given message flow to identify one or more branches in a sequence of the two or more messages, a given one of the one or more branches comprising a given conditional clause and two or more possible action clause paths from the given conditional clause;

determining rankings of each of the two or more possible action clause paths based at least in part on complexities of sets of one or more action clauses in each of the two or more possible action clause paths;

selecting, for the given user, a particular one of the two or more possible action clause paths based at least in part on the determined rankings of each of the two or more possible action clause paths and the determined skill level of the given user; and providing, to the given user via the artificial intelligence guided conversation system, the selected action clause path.

14. A method comprising:

training a machine learning model of an artificial intelligence guided conversation system to perform role classification for users interacting with the artificial intelligence guided conversation system;

identifying one or more message flows in the artificial intelligence guided conversation system that are associated with a given user, a given one of the one or more message flows comprising two or more messages associated with management of a given one of one or more information technology assets in an information technology infrastructure;

determining, by parsing responses of the given user in the one or more message flows utilizing the machine learning model of the artificial intelligence guided conversation system, a skill level of the given user;

parsing the given message flow to identify one or more branches in a sequence of the two or more messages, a given one of the one or more branches comprising a given conditional clause and two or more possible action clause paths from the given conditional clause;

determining rankings of each of the two or more possible action clause paths based at least in part on complexities of sets of one or more action clauses in each of the two or more possible action clause paths;

selecting, for the given user, a particular one of the two or more possible action clause paths based at least in part on the determined rankings of each of the two or more possible action clause paths and the determined skill level of the given user; and providing, to the given user via the artificial intelligence guided conversation system, the selected action clause path;

wherein the method is performed by at least one processing device comprising a processor coupled to a memory, the at least one processing device implementing the artificial intelligence guided conversation system.

15. The apparatus of claim 1 wherein the at least one processing device is further configured to perform the steps of:

maintaining a data structure characterizing parameters needed for successful traversal of action clause paths in the one or more branches in the sequence of the two or more messages;

determining, utilizing the data structure, a set of parameters needed for successful traversal of the selected action clause path; and controlling the providing of the selected action clause path to the given user via the artificial intelligence guided conversation system based at least in part on identifying whether the set of parameters needed for successful traversal of the selected action clause path are available.

16. The apparatus of claim 1 wherein controlling the providing of the selected action clause path to the given user via the artificial intelligence guided conversation system comprises, responsive to determining that at least one parameter required for automation of one or more actions in the selected action clause path is not available, to output a request for the at least one parameter from the given user in a message output in the artificial intelligence guided conversation system.

17. The computer program product of claim 13 wherein the program code when executed by the at least one processing device further causes the at least one processing device to perform steps of:

maintaining a data structure characterizing parameters needed for successful traversal of action clause paths in the one or more branches in the sequence of the two or more messages;

determining, utilizing the data structure, a set of parameters needed for successful traversal of the selected action clause path; and controlling the providing of the selected action clause path to the given user via the artificial intelligence guided conversation system based at least in part on identifying whether the set of parameters needed for successful traversal of the selected action clause path are available.

18. The computer program product of claim 17 wherein controlling the providing of the selected action clause path to the given user via the artificial intelligence guided conversation system comprises, responsive to determining that at least one parameter required for automation of one or more actions in the selected action clause path is not available, to output a request for the at least one parameter from the given user in a message output in the artificial intelligence guided conversation system.

19. The method of claim 14 further comprising:

maintaining a data structure characterizing parameters needed for successful traversal of action clause paths in the one or more branches in the sequence of the two or more messages;

determining, utilizing the data structure, a set of parameters needed for successful traversal of the selected action clause path; and controlling the providing of the selected action clause path to the given user via the artificial intelligence guided conversation system based at least in part on identifying whether the set of parameters needed for successful traversal of the selected action clause path are available.

20. The method of claim 19 wherein controlling the providing of the selected action clause path to the given user via the artificial intelligence guided conversation system comprises, responsive to determining that at least one parameter required for automation of one or more actions in the selected action clause path is not available, to output a request for the at least one parameter from the given user in a message output in the artificial intelligence guided conversation system.

\* \* \* \* \*